United States Patent
Szakalos et al.

(10) Patent No.: US 7,041,252 B2
(45) Date of Patent: May 9, 2006

(54) COPPER BASE ALLOY

(75) Inventors: Peter Szakalos, Stockholm (SE); Mats Lundberg, Sandviken (SE); Johan Hernblom, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 61 days.

(21) Appl. No.: 10/375,153

(22) Filed: Feb. 28, 2003

(65) Prior Publication Data
US 2004/0005239 A1    Jan. 8, 2004

(30) Foreign Application Priority Data
Feb. 28, 2002    (SE) .................................... 0200636

(51) Int. Cl.
*C22C 9/02*    (2006.01)

(52) U.S. Cl. ...................... 420/489; 148/527; 148/532; 148/536

(58) Field of Classification Search ................ 420/489; 148/527, 532, 536
See application file for complete search history.

(56) References Cited

U.S. PATENT DOCUMENTS

| | | | |
|---|---|---|---|
| 1,841,910 A | 1/1932 | Pier et al. | |
| 1,848,466 A | 3/1932 | Edmonds | |
| 2,234,568 A | 3/1941 | Linckh | |
| 2,621,202 A | 12/1952 | Peukert et al. | |
| 4,224,087 A | 9/1980 | Tachikawa et al. | |
| 4,436,790 A | 3/1984 | Prinz et al. | |
| 5,405,525 A | 4/1995 | Heyse et al. | |
| 5,406,014 A | 4/1995 | Heyse et al. | |
| 5,413,700 A | 5/1995 | Heyse et al. | |
| 5,575,902 A | 11/1996 | Heyse et al. | |
| 5,593,571 A | 1/1997 | Heyse et al. | |
| 5,658,452 A | 8/1997 | Heyse et al. | |
| 5,674,376 A | 10/1997 | Heyse et al. | |
| 5,676,821 A | 10/1997 | Heyse et al. | |
| 5,723,707 A | 3/1998 | Heyse et al. | |
| 5,849,969 A | 12/1998 | Heyse et al. | |
| 5,863,418 A | 1/1999 | Heyse et al. | |
| 5,866,743 A | 2/1999 | Heyse et al. | |
| 6,737,175 B1 * | 5/2004 | Ramanarayanan et al. | .. 428/674 |
| 2003/0029528 A1 | 2/2003 | Ramanarayanan et al. | |

FOREIGN PATENT DOCUMENTS

| | | | |
|---|---|---|---|
| BE | 1011190 | * | 6/1999 |
| CH | 344848 | | 4/1960 |
| DE | 127414 | | 3/1898 |
| DE | 390917 | | 2/1924 |
| DE | 690 333 | | 4/1940 |

(Continued)

OTHER PUBLICATIONS

Swedish Patent Office International Search Report dated May 27, 2003, for PCT/SE03/00348.

(Continued)

*Primary Examiner*—Sikyin Ip
(74) *Attorney, Agent, or Firm*—Drinker Biddle & Reath LLP

(57) ABSTRACT

A copper base alloy, which is resistant or immune to carburization, metal dusting and coking, and resistant to oxidation, the alloy having the following composition (all contents in weight %):

Al >0–15
Si 0–6
Mg 0–6
one or more of the group of Rare Earth Metal (REM), yttrium, hafnium, zirconium, lanthanum, cerium) up to 0.3 wt. % each;
Cu balance; and
normally occurring alloying additions and impurities. Related articles of manufacture and methods are also described.

11 Claims, 1 Drawing Sheet

FOREIGN PATENT DOCUMENTS

| | | |
|---|---|---|
| DE | 1 154 642 | 9/1963 |
| DE | 1154 642 | 9/1963 |
| DE | 24 58 379 | 4/1976 |
| DE | 381126 C1 | 1/1989 |
| EP | 0 039 242 A1 | 11/1981 |
| FR | 1475198 | 3/1967 |
| FR | 2 689 908 A1 | 10/1993 |
| GB | 448187 | 6/1936 |
| GB | 1157658 | 7/1969 |
| GB | 1157660 | 7/1969 |
| GB | 2 066 696 A | 7/1981 |
| JP | 03291343 * | 12/1991 |
| JP | 2001240924 * | 9/2001 |
| SU | 544700 | 3/1977 |
| WO | 88/00250 A1 | 1/1988 |
| WO | 03/014263 A1 | 2/2003 |

OTHER PUBLICATIONS

International Standard (ISO 197/1-1983 (E))—Copper and copper alloys—Terms and definitions—Part 1: Materials.
"Binary Alloy Phase Diagrams", *American Society for Metals*, Ed. T. B. Massalski, vol. 1, 1987, p. 917.

* cited by examiner

COPPER BASE ALLOY

This application claims priority under 35 U.S.C. §§ 119 and/or 365 to 0200636-9 filed in Sweden on Feb. 28, 2002; the entire content of which is hereby incorporated by reference.

FIELD OF THE INVENTION

The present invention relates to a Cu base alloy, which is resistant or immune to carburization, metal dusting and coking, and resistant to oxidation. The invention is also directed to uses, of said alloy in construction components in CO containing atmospheres, and/or hydrocarbon containing atmospheres, or solid carbon containing processes, as well as articles formed from such alloys.

BACKGROUND OF THE INVENTION

A number of inventions in the past related to reforming processes in the petrochemical industry has led to significant process efficiency improvements. One such example is the development of large pore zeolite catalysts, doped with specific metals, rendering catalysts with a high selectivity suitable for precision reforming and/or synthesis, which for example has made possible more effective and economic production of a range of highly demanded commercial liquids based on hydrocarbon feedstocks. However, the catalysts were soon discovered to be sensitive to sulfur poisoning, leading to techniques to desulfurize the hydrocarbon feed being developed. Later, such catalysts were also found to be quickly deactivated by water, thus corresponding protecting technologies to lower the water content in the process gas streams were also developed.

In turn, the low-sulfur and low-water conditions led to coke formation and plugging within reactor systems, an effect later possible to relate back to a severe form of disintegrating attack on metallic materials of the equipment parts, like furnace tubes, piping, reactor walls, etc. This metal disintegrating mechanism was actually already known since the 1940's as "metal dusting" however, this phenomenon was seldom seen because at the time reforming techniques included high sulfur levels in the process gas and very high reforming and synthesis pressures, (since less effective catalysts were available).

Thus, with the above description of the historic developments as a background, it is understood that, in the petrochemical industry today, there is a need for a solution against the effects, of and the cause for, metal dusting.

As earlier mentioned, metal dusting is a form of carburization where the metal disintegrates rapidly into coke and pure metal. The dusting metal particulates can be transported with the process gas, accumulates downstream on various reactor parts, and throughout the whole reactor system, metastasize catalytic coking that can create blockage.

It is generally appreciated that metal dusting is a large concern in the production of hydrogen and syngas ($H_2$/CO mixtures). In these plants, methane and various other higher hydrocarbons are reformed or partially oxidized to produce hydrogen and carbon monoxide in various amounts for use in producing other higher molecular-weight organic compounds. Increased reaction and heat-recovery efficiencies of the processes necessitate operating process equipment at conditions that favor metal dusting.

The need for increased heat recovery in ammonia-synthesis processes has caused metal dusting problems in the heat-recovery section of the reformed-gas system, as well as in the reformer itself.

Metal dusting is also a problem in direct iron-ore reduction plants wherein reformed methane is dried and reheated to enhance ore-reduction efficiencies. Metal dusting occurs in the reformer, reformed-gas reheater and piping up-stream of the ore-reduction system. Metal dusting is also experienced in the heat-treating industry in equipment that handles items being treated (annealed, carburized, etc.). Gases used in heat treating mix with oil residue to form gases that are chemically favorable for metal dusting. Gas mixtures used for carburizing can also cause metal dusting if control of the chemistry of the process is not managed.

Petroleum refineries experience metal dusting in processes involving hydro-dealkylation and catalyst regeneration systems of "plat-former" units.

Other processes wherein metal dusting occurs are nuclear plants that employ carbon dioxide for cooling, the recycle-gas loop equipment of coal-gasification units, in fired heaters handling hydrocarbons at elevated temperatures, iron-making blast furnaces in steel mills, and fuel cells using molten salts and hydrocarbons.

In recent years, there has been an emphasis on reforming and synthesis technology developments to make possible commercialization of remotely located, so called "stranded gas reserves". The synthesis step, based on further developments of the Fischer Tropsch process, will require the use of compositions of the synthesis gas that will cause severe metal dusting, with lower steam to carbon ratios and higher $CO/CO_2$ ratios. However, only small steps this direction have been taken due to lack of material with sufficient resistance to metal dusting.

Other solutions used today to provide protection against metal dusting and reduce coke formation, are the use of advanced nickel or iron base alloys with high amounts of chromium and certain additions of aluminum. Some surface modification methods based on diffusion techniques or coatings through overlay welding, laser-fusion, Chemical Vapor Deposition (CVD), Physical Vapor Deposition (PVD) or spraying has also been tested. Many of these methods involve materials based on transition metals, such as iron, nickel and cobalt, which are known for their catalytic properties that promote coke formation.

There are metals, such as Cu and Sn, that are known to be resistant or immune to carburization and coke formation, but have either a melting point, which is too low or insufficient oxidation resistance. Oxidation resistance is required since the solid coke is periodically removed by oxidation in steam and air. Consequently, the metal surfaces in contact with the carburizing process gas must also have adequate oxidation resistance, which excludes Cu and low alloyed Cu as a useful carburization-resistant material in practice. Even if the decoking step can be excluded in some processes, the start-up procedures after an inspection or other stops inevitably require oxidation-resistant metal surfaces.

SUMMARY OF THE INVENTION

It is therefore an object of the present invention to provide a copper base alloy which is resistant or immune to carburization, metal dusting and coking.

It is another object of the invention to provide a copper-base alloy resistant or immune to oxidation, especially resistant in CO-containing atmospheres, and/or hydrocarbon containing atmospheres, solid carbon containing processes such as gasification of solid carbonaceous materials, thermal decomposition of hydrocarbons and catalytic reforming, particularly, catalytic reforming under low-sulfur, and low-sulfur and low-water conditions.

It is a third object of the invention to provide a copper base alloy which will not catalytically activate the formation of solid coke.

It is a further object of the invention to provide a copper base alloy which is resistant or immune to carburization, metal dusting and coking, for use in CO-containing atmospheres, and/or hydrocarbon containing atmospheres, solid carbon containing processes such as gasification of solid carbonaceous materials, thermal decomposition of hydrocarbons and catalytic reforming, particularly, catalytic reforming under low-sulfur, and low-sulfur and low-water conditions.

DETAILED DESCRIPTION OF THE INVENTION

Figure 1:
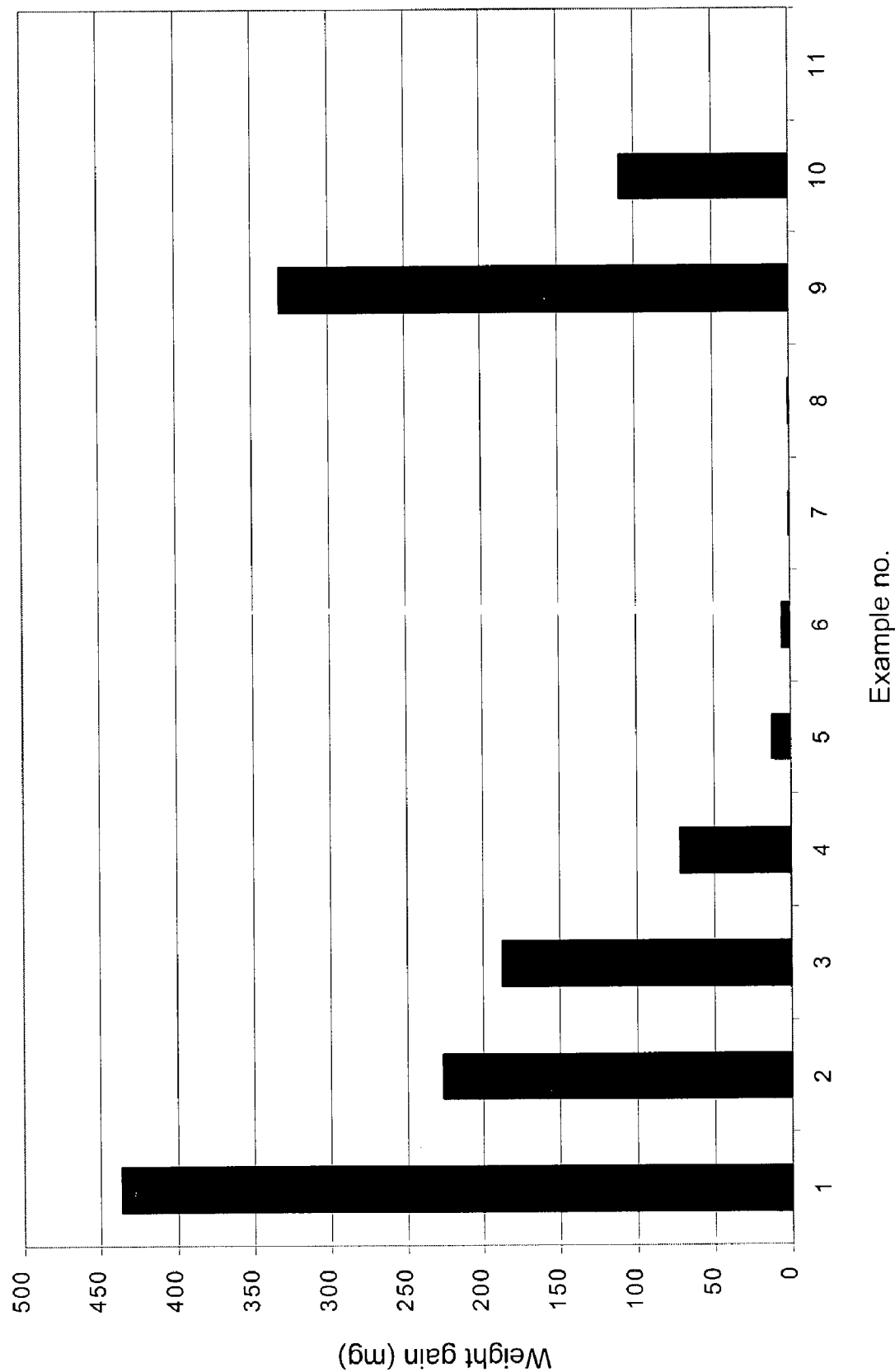
FIG. 1 shows diagrammatically the weight loss of some comparative samples and one example of the present invention, after exposure at 650° C. over a period of time of 1000 hours (4 cycles to RT) in $25CO+3H_2O+H_2$.

Exemplary embodiments of the present invention will now be described.

Aluminum

Aluminum should be added in an amount up to 15 wt. %, preferably up to 13 wt. %, most preferably up to 8 wt. %, but not less than 2 wt. %, preferably not less than 4 wt. %.

Silicon

Silicon promotes the protective effect of aluminum in this type of alloy by forming aluminum silicate, which has a higher formation rate compared to that of pure alumina. In this type of alloy, the lower starting temperature for the formation of a protective oxide is favorable. Therefore the content of silicon should be up to 6 wt. %, preferably up to 4 wt. %. The content of Si should preferably not be below 2 wt. %.

Magnesium

Magnesia has the same properties as aluminum in that it would reduce the oxidation rate of copper. Therefore, magnesium could to some extent replace aluminum in the alloy. The content of magnesium should therefore be limited to $\geq 0$–6 wt. %, preferably up to 4 wt. %.

Reactive Additions

In order to further increase the oxidation resistance at higher temperatures, it is common practice to add a certain amount of reactive elements, such as Rare Earth Metals (REM), e.g.—yttrium, hafnium, zirconium, lanthanum, and/or cerium. One or more of this group of elements should be added in an amount not exceeding 0.3 wt. %.

Other Additions

The transition metals, in particular iron, nickel and cobalt are known to have a strong catalytic effect on the formation of solid coke. Therefore the content of each of these elements each in the alloy of the present invention should not exceed 1 wt. %.

Copper

The main component, which makes up the balance of the alloy of the present invention, is copper. Copper is known to be inert with respect to catalytic activity and coking. Until today it has not been possible to use copper in these applications, due to its high oxidation rate when in contact with oxygen.

The alloy may comprise up to 98 wt. % Cu. According to one at least 73 wt. % Cu.

Further, the alloy may comprise normally occurring alloying additions and impurities.

The alloy material can be processed as construction material in the shape of tubes, pipes, plate, strip and wire.

A person skilled in the art understands that the alloy of the present invention may need a load-bearing component at elevated temperatures, i.e. temperatures above approximately 200° C. For this purpose the material can be processed as one component in a composite or bimetallic composite used as construction material formed into different shapes as mentioned above.

An alloy according to the present invention is especially well-suited for use in CO-containing atmospheres and/or hyrocarbon-containing atmospheres, or solid carbon-containing processes, for example, gasification of solid carbonaceous materials, thermal decomposition of hydrocarbons, and catalytic reforming particularly under low-sulfur and/or low water conditions at elevated temperatures such as 1000° C., 1020° C., or 1049° C.

EXEMPLARY EMBODIMENTS AND COMPARATIVE EXAMPLES

Static laboratory exposures were performed in a tube furnace in a highly carburizing atmosphere. The metal dusting resistance was evaluated between standard grade stainless steels and a Cu-base alloy A according to the present invention. The chemical compositions of the materials investigated are given in Tables 1 and 2.

Table 1 lists the chemical compositions of the investigated comparative materials and Table 2 lists the composition of an example "A" of the present invention, All contents are given in wt. %.

TABLE 1

Chemical composition of the comparative materials

| Example no. | C | Cr | Ni | Mo | N | Si | Mn | P | S | Ti | Ce |
|---|---|---|---|---|---|---|---|---|---|---|---|
| 304 L (bar) | 0.01 | 18.35 | 10.15 | 0.39 | 0.043 | 0.42 | 1.26 | 0.024 | 0 | | |
| 304 L (sheet) | 0.015 | 18.20 | 10.10 | 0.39 | 0.043 | 0.43 | 1.42 | 0.021 | 0.001 | — | — |
| Alloy 800 HT | 0.063 | 20.37 | 30.10 | 0.05 | 0.009 | 0.73 | 0.53 | 0.009 | 0.001 | 0.5 | — |
| 353 MA | 0.052 | 25.10 | 34.10 | 0.20 | 0.175 | 1.56 | 1.40 | 0.020 | 0.001 | — | 0.06 |

TABLE 2

| | Al | Ni | Fe | Si | Mg | Cr | V | Bi | Ti | Zr | Mo | Cu |
|---|---|---|---|---|---|---|---|---|---|---|---|---|
| Chemical composition of alloy A | | | | | | | | | | | | |
| A | 8.0 | 0.02 | 0.02 | 0.01 | 0.005 | 0.002 | 0.001 | 0.0001 | 0.0001 | 0.0001 | 0.0001 | balance |

The test samples were cut from sheets or bars into shape with dimensions of approximately −10×12×3 mm and prepared by grinding with 600 mesh. Some of the test samples were surface treated by a standard pickling operation in 1.8M $HNO_3$+1.6M HF at 50° C. for 8–40 min., or treated by an electropolishing operation (50 g $CrO_3$+450 ml ortophosphoric acid, 20V). The samples were cleaned in acetone prior to testing and placed in the cold furnace. To reach a low oxygen partial pressure, pure hydrogen was flushed through the furnace for three hours before introducing the reaction gas and heating to temperature. The gas flow rate was 250 ml/min, which corresponds to a gas velocity over the specimen of 9 mm/s. The temperature stabilizes at 650° C. after 20 minutes heating. The reaction gas, with an input composition of 25% CO+3% $H_2O$+72% $H_2$. The laboratory exposure was conducted at 650° C./1000 h in a quartz tube furnace with a diameter of 25 mm. Four temperature cycles down to 100–200° C. and back to 650° C., each with a duration time of about 4–5 h, were conducted in order to raise the carbon activity and promote initiation of metal dusting.

The results are presented as weight loss measurements after cleaning the samples from coke and graphite as presented in FIG. 1, where:

TABLE 3

Description of the comparative examples

| Example no. | Alloy | Product condition | Surface modification |
|---|---|---|---|
| 1 | 304 L | bar | annealed |
| 2 | 304 L | bar | electro-polished |
| 3 | 304 L | bar | ground |
| 4 | 304 L | bar | pickled |
| 5 | 304 L | sheet | annealed |
| 6 | 304 L | cold rolled sheet | ground |
| 7 | 304 L | cold rolled sheet | electro-polished |
| 8 | 800 HT | sheet | ground |
| 9 | 800 HT | sheet | pickled |
| 10 | 353 MA | sheet | overpickled |
| 11 | Alloy A | sheet | untreated |

As shown in FIG. 1, all comparative steels (Examples 1–10) suffered from metal dusting with formation of pits and coke during the 1000 h exposure as indicated by a measurable weight gain. However, the alloy of the present invention (Example no. 11) was virtually non-reactive in this atmosphere with no weight change or coke formation. Example 11 has been exposed totally 4000/hours in similar atmospheres (4×1000 h at 650° C.) with no measurable or visible changes.

While the present invention has been described by reference to the above-mentioned embodiments certain modifications and variations will be evident to those of ordinary skill in the art. Therefore, the present invention is to be limited only by the scope and spirit of the appended claims.

We claim:

1. A copper base alloy, consisting of in weight %:
   Al >0–15;
   Si 0.01–6;
   Mg 0.005–6;
   one or more Rare Earth Metals (REM) in an amount up to 0.3% each;
   Fe 0.02% to less than 1%;
   Cu balance; and
   normally occurring alloying additions and impurities.

2. The copper base alloy according to claim 1, consisting of up to 13% Al.

3. The copper base alloy according to claim 1, consisting of up to 8% Al.

4. The copper base alloy according to claim 1, consisting of at least 2% Al.

5. The copper base alloy according to claim 1, consisting of at least 4% Al.

6. The copper base alloy according to claim 1, consisting of up to 5% Si.

7. The copper base alloy according to claim 1, consisting of up to 4 wt. % Mg.

8. The copper base alloy according to claim 1, wherein the group of Rare Earth Metals comprises one or more of: yttrium, hafnium, zirconium, lanthanum, and cerium.

9. An article of manufacture in the form of a tube, pipe, plate, strip or wire, the article formed, at least in part, from the alloy of claim 1.

10. The article according to claim 9, comprising at least a portion thereof formed from the alloy.

11. The copper base alloy according to claim 1, consisting of at least 2 wt. % Si.

* * * * *